May 24, 1938.                L. FERENCI                2,118,500
                          DOUGH MIXING MACHINE
                          Filed July 11, 1935            5 Sheets-Sheet 1

INVENTOR
Lester Ferenci
BY George S. Hastings
ATTORNEY

May 24, 1938.  L. FERENCI  2,118,500

DOUGH MIXING MACHINE

Filed July 11, 1935  5 Sheets-Sheet 2

INVENTOR
Lester Ferenci
BY George S. Hastings
ATTORNEY

May 24, 1938.  L. FERENCI  2,118,500
DOUGH MIXING MACHINE
Filed July 11, 1935   5 Sheets-Sheet 3

INVENTOR
Lester Ferenci
BY George S. Hastings
ATTORNEY

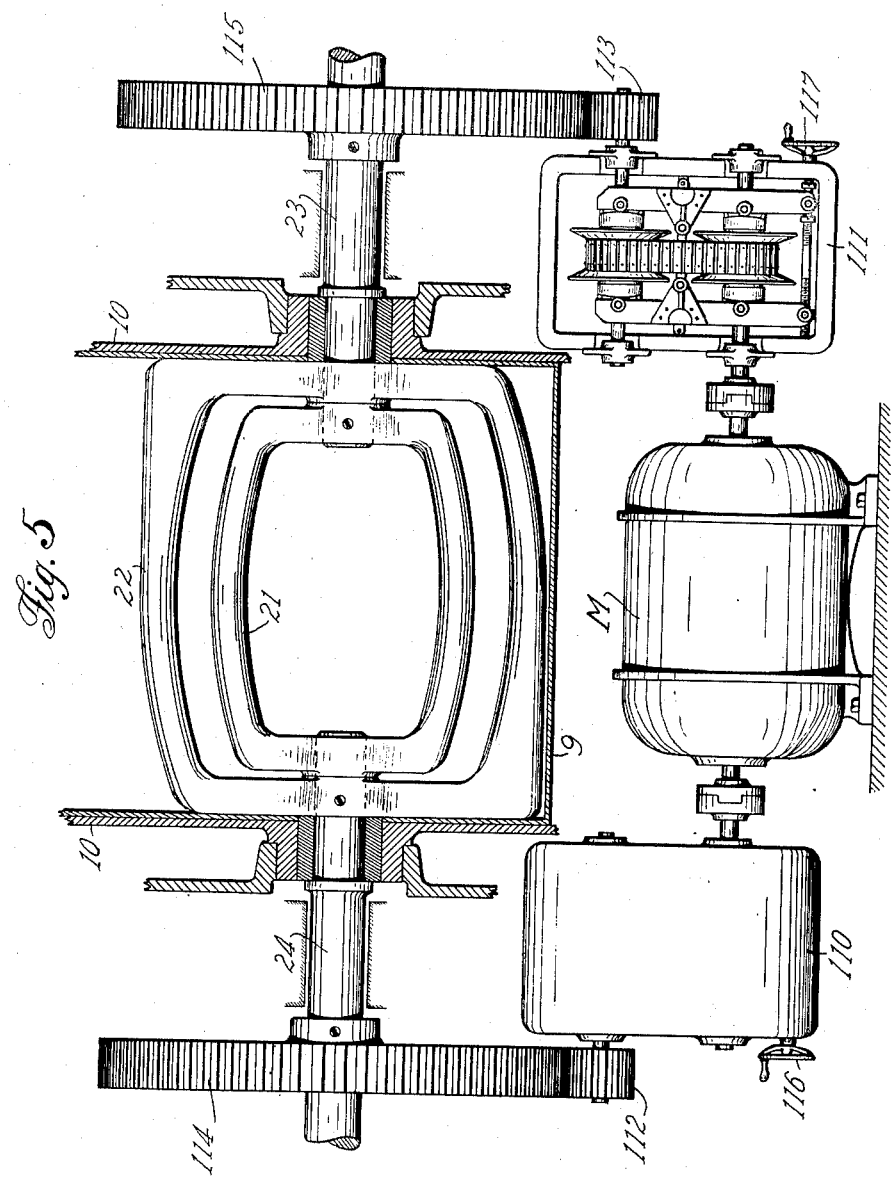

Patented May 24, 1938

2,118,500

UNITED STATES PATENT OFFICE 2,118,500

DOUGH MIXING MACHINE

Lester Ferenci, Brooklyn, N. Y., assignor to American Machine & Foundry Company, a corporation of New Jersey Application July 11, 1935, Serial No. 30,805

9 Claims. (Cl. 259—105)

The present invention relates to a novel machine for mixing dough or like plastic material, more especially for mixing and kneading dough for bread and like bakery products.

The main object of the invention is to provide a novel and effective machine for carrying out a novel method of mixing and kneading the dough, the machine for this purpose having a novel construction and principle whereby the beaters may be driven at a differential speed or in unison. To this end provision is made for independent operation of the beaters and, therefore attainment of greater flexibility than obtained heretofore. Still another object is to provide the dough mixing bowl or chamber with improved stuffing-boxes in order to prevent foreign matter from entering the chamber or leakage therefrom during operation. Still another object of the invention is to provide the mixing bowl with a jacket through which a cooling medium may be circulated to prevent excessive heating of the dough during the operation of the beaters. A further object is to place a thermometer in the mixing bowl in such a way that it will indicate the exact temperature of the air within the mixing chamber and thus attain a truer reading of the temperature of the batch while being worked by the beaters. Another objective of the invention is to tilt the mixing bowl by a motor of suitable type for example a "torque" motor, and stall the same at the limits of the tilting movement of the bowl, thus eliminating brakes and other heretofore required mechanism. Still another object is to use the shaft of the tilt motor as a crank shaft for the purpose of tilting the mixing bowl by hand. With these and other objects not specifically mentioned in view the invention consists in certain constructions and combinations hereinafter fully described and then specifically set forth in the claims hereunto appended.

In the accompanying drawings which form a part of this specification and in which like characters of reference indicate the same or like parts:

Fig. 5 shows an alternative arrangement for controlling the operation of the beaters mechanically.

Figure 1:
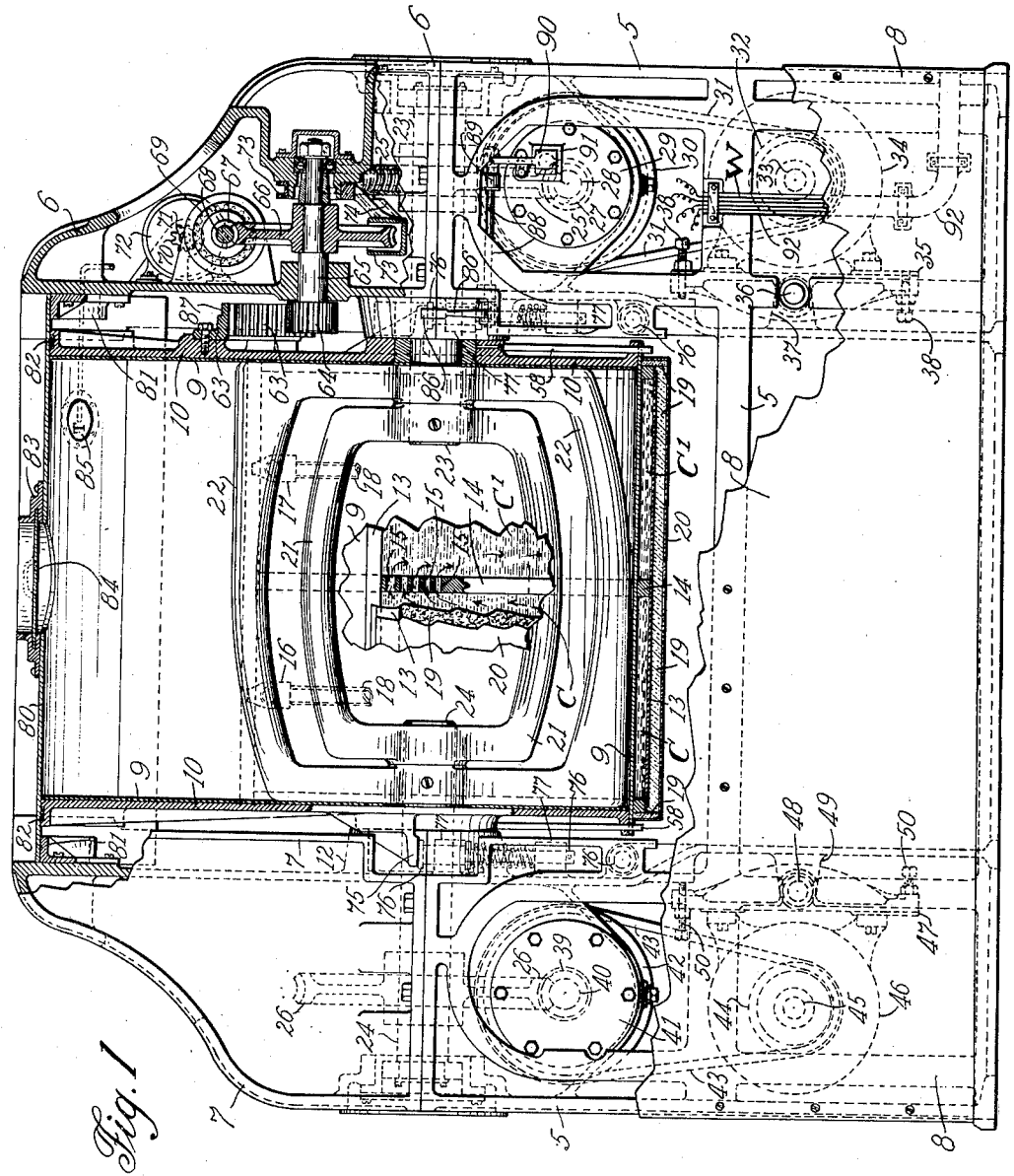
Fig. 1 is a front elevation of the machine shown partly in section.

In carrying the invention into effect there is provided a mixing bowl, a set of beaters arranged within said bowl, and means for driving said beaters at a differential speed or in unison. In the best constructions contemplated there are provided motors for driving the beaters and an electrical control for causing the motors to drive the beaters at differential speed or in unison, or the beaters may be driven from a single motor through variable speed drives which may be manually adjusted to obtain a differential speed, or the same speed, of the beaters; and the mixing bowl may be tilted by a motor of suitable type geared thereto and adapted to be stalled at predetermined limits of the tilting of the bowl. These various means and parts may be widely varied in construction within the scope of the claims for the particular machines selected to illustrate the invention are merely illustrative of many possible concrete embodiments of the same. The invention, therefore, is not to be restricted to the particular machine shown and described.

Referring to the drawings, the dough mixing machine may be provided with a main base 5 upon the opposite ends of which are mounted the housings 6 and 7. The base 5 and the housings 6 and 7 support and entirely enclose the various mechanisms of the machine, wherefore the exterior of the machine will have an attractive appearance as the base 5 and housings 6 and 7 are covered with sheets 8 of polished metal which hide all the working parts.

The mixing of its ingredients and the kneading of the dough takes place in a mixing bowl or chamber 9 made of non-corrosive or other suitable type of sheet metal and having any desirable or familiar shape such as is usual in the art. In order to maintain the necessary rigidity and strength, the chamber 9 is provided with two end or head plates 10 equipped with hollow trunnions 11 by means of which it is supported in journal-boxes 12 consisting of pillow-blocks formed integrally with the base 5 and caps fastened to the housings 6 and 7. To the exterior of the mixing chamber 9 is attached a water jacket 13 extending over the sides and bottom of the same across the full length thereof and serving the purpose of dissipating the heat generated during the kneading operation. The water jacket 13 is divided by a rib 14 into two compartments C and C1 which are connected to each other by ducts 15 located in that part of the rib 14 which extends into the uppermost section of the water jacket 13 at one side of the mixing chamber. The compartment C is equipped at the other side of the mixing chamber with an inlet 16 through which the water or other cooling medium is forced by means of a pump or any suitable water supply (not shown). The cooling medium first travels through the entire length of the compartment C and then, after entering the second compartment C' through ducts 15, travels the entire length of the latter and leaves the same through an outlet 17. This arrangement assures cooling to the desired degree of every portion of the mixing chamber 9 which comes in contact with the dough during the kneading operation. The cooling medium is conducted into the inlet 16 and out of the outlet 17 by flexible tubes or hoses 18 in order to permit tilting of the mixing chamber on its trunnions 11. Furthermore the water jacket 13 is insulated by lagging consisting of a layer of composition cork 19 or the like which is held in place by a sheet metal cover 20 attached to the water jacket 13.

Within the mixing chamber 9 are mounted to revolve, one within the other, a pair of mixing arms or beaters 21 and 22 of any shape which is well known in the art, suitable configurations being described in Letters Patent No. 1,568,291, granted January 5, 1926, on the application of Felix Notz, et al. The two beaters 21 and 22 are independently driven from their opposite ends, the beater 21 being driven by a shaft 23 and the beater 22 being driven by a shaft 24. The free ends of each beater 21 and 22 may be loosely supported on the driving shaft of the other beater and both shafts 23 and 24 may be driven individually by means of worm wheels 25 and 26 respectively keyed thereon. To this end the worm wheel 25 meshes with a worm 27 on a shaft 28 journaled in ball bearings 29 supported in brackets fastened to the base 5. Shaft 28 may be driven in any desired manner, as by a sheave 30 driven by V-belts 31 from a sheave 32 mounted on the shaft 33 of a motor 34 attached to a motor bed 35 pivoted on a pair of pins 36 held by lugs 37 of base 5. The motor bed 35 is also equipped with a pair of adjusting screws bearing against opposite faces of the inner wall of base 5 for the purpose of holding the motor immovable after it has been adjusted on the pins 36 to obtain the desired tension of the belts 31. Worm wheel 26 on shaft 24, which operates the beater arm 22, is driven in exactly the same manner as worm wheel 25, the worm wheel 26 meshing with a worm 39 on a shaft 40 journaled in ball bearings 41 supported from base 5. Shaft 40 carries a pulley 42 which through V-belts 43 is driven by a pulley 44 mounted on the shaft 45 of motor 46. The latter is likewise attached to a motor bed 47 pivoted on a pair of pins 48 held by lugs 49 of base 5. Motor bed 47 is also equipped with a pair of adjusting screws 50 serving a purpose similar to the adjusting screws 38 of motor bed 35.

Figure 3:
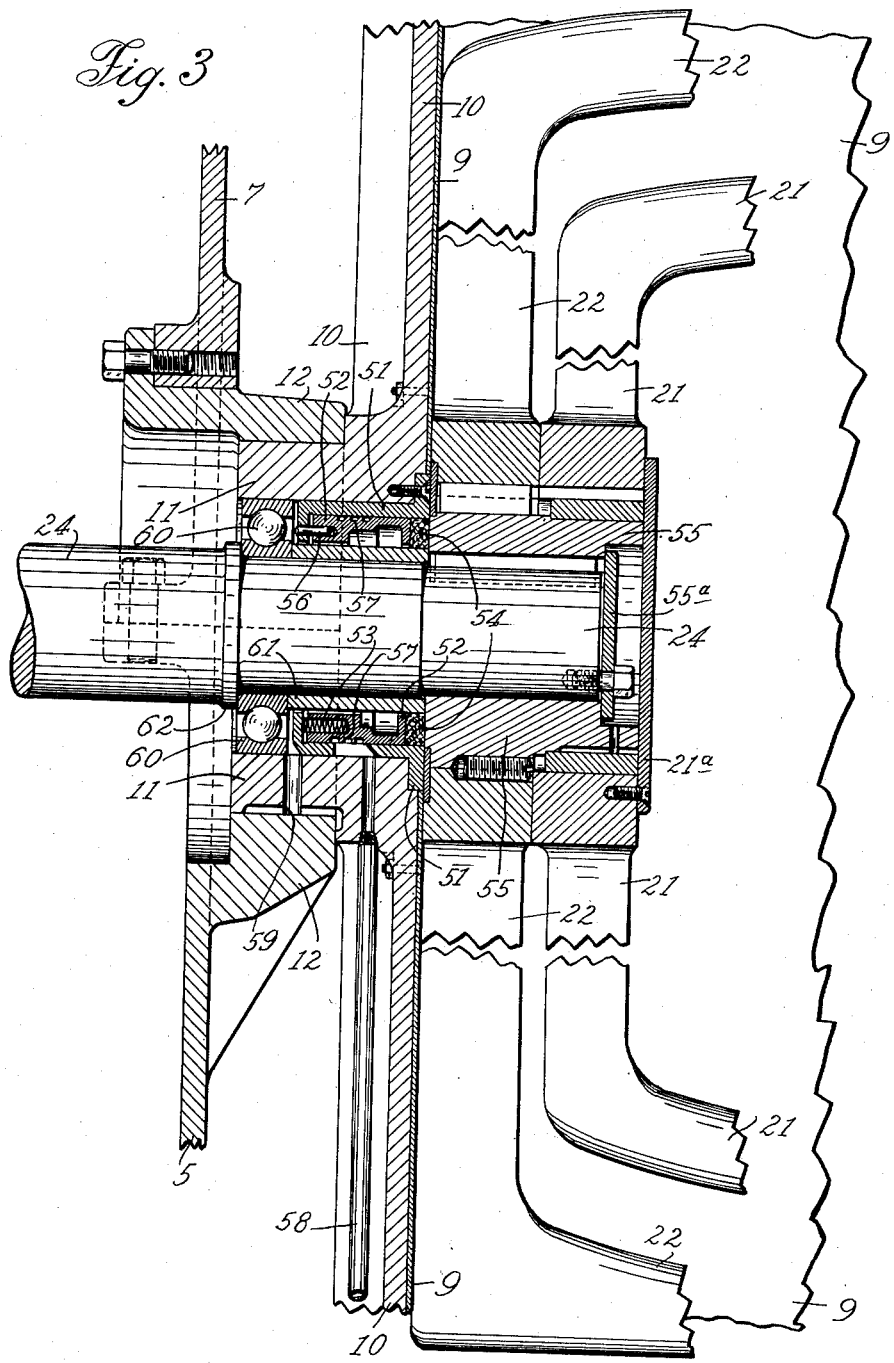
Fig. 3 is a detail sectional view of the mixing arm drive and the mixing bowl.

In order to prevent entry of any foreign matter such as oil, grease, etc., into the mixing bowl 9, the bearings of the beater drive shafts 23 and 24 are equipped with stuffing-boxes (Fig. 3). These stuffing-boxes also prevent any of the ingredients placed in the mixing bowl 9, or any particles of dough, from entering said bearings. Each stuffing-box, as shown in Fig. 3, may consist of a bushing 51 extending into the bore of each trunnion 11 and attached to the inner face of each head plate 10. Within each bushing 51 is slidably mounted a gland 52 which is pressed by a set of springs 53 seated against a flange on the inner end of the bushing, against a washer 54 of durable packing material opposing a sleeve 55 which is keyed to either the beater 21 or 22 and splined on its corresponding drive shaft 23 or 24. Each sleeve 55 is retained on its shaft 23 or 24 by a disk 55a bearing against an internal shoulder of the sleeve 55 and fastened to the end of the shaft. The bushing 51 is equipped with a number of guide pins 56 which slidably engage with corresponding holes in their glands 52. The latter, furthermore, are provided with a number of circumferential grooves 57 for the purpose of directing any leakage from the mixing chamber into a collecting duct of each bushing 51 which communicates with an orifice in the trunnion leading into a drain pipe 58 on each head plate 10 of the mixing chamber. At their bottom the trunnions 11 of head plates 10 are also equipped with ducts 59 which will provide an outlet for any excess oil supplied to the ball bearings 60 of each drive shaft. Said ball bearings 60 are held by means of a spacer or sleeve 61 against a shoulder 62 provided on each drive shaft, the spacer 61 being disposed within the gland 57 and held against the ball bearings 60 by the sleeve 55.

The hub provided in the free end of the beater 21 rotates on a bushing held against an external shoulder on the sleeve 55 by a cover 21a fastened to said hub (Fig. 3). Upon removing the cover 21a and the disk 55a the sleeve 55 may be drawn off the shaft 24, the hub of the beater 21 being provided with a keyway to permit passage therethrough of the key on the sleeve 55. In this manner access may be had to the packing 54 for removal and replacement thereof. The hubs at the other ends of the frames 21 and 22 are similarly constructed to permit removal of their sleeve 55, except that the latter is keyed to the frame 21 and the frame 22 is free to revolve on the sleeve. Furthermore, instead of being splined to the shafts 23 and 24 and retained thereon by the disks 55a as shown, the sleeves 55 may be removably fastened to the shafts 23 and 24 by set screws or the like.

Figure 2:
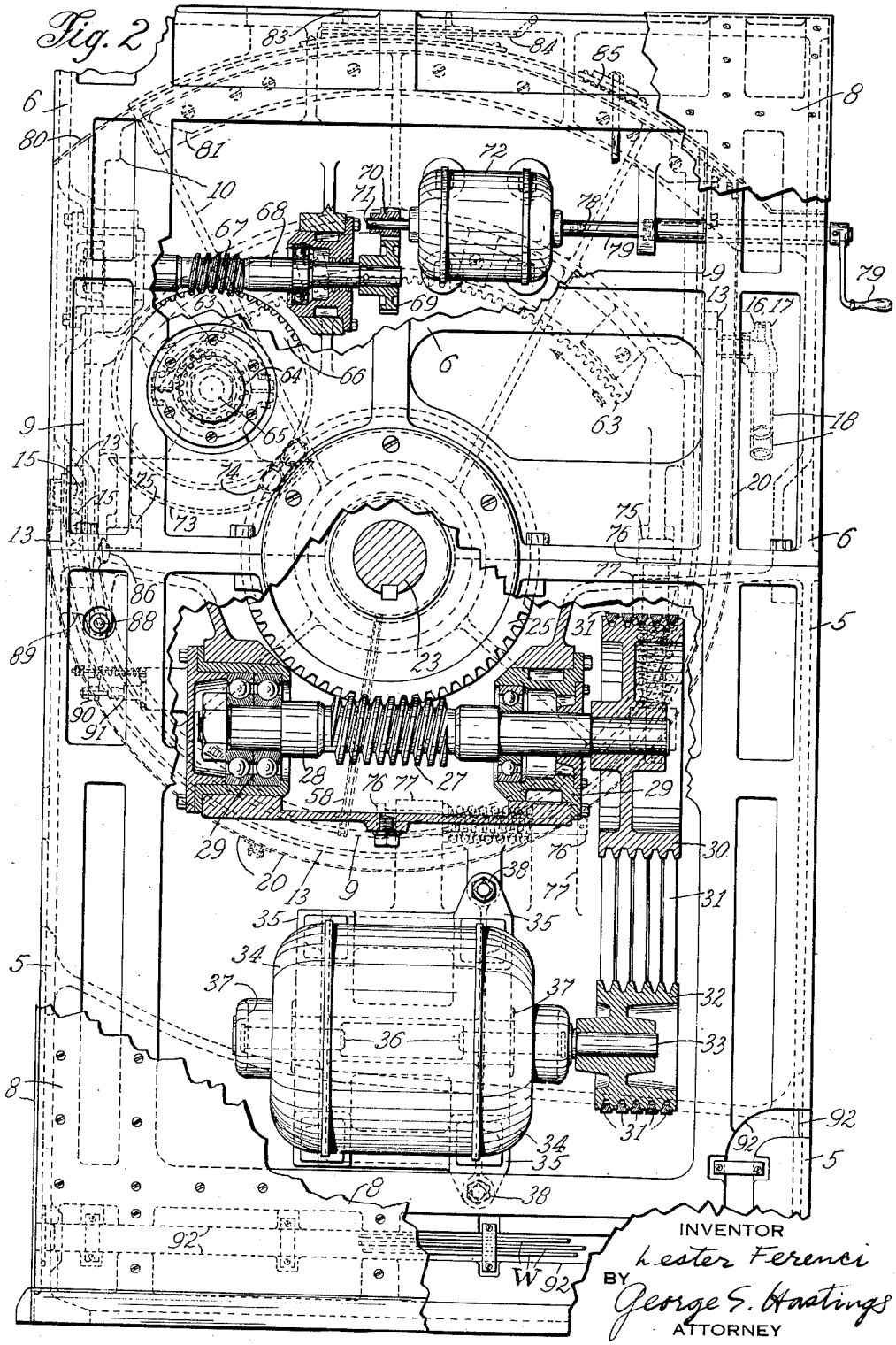
Fig. 2 is a side elevation of the same, also shown partly in section.

For the purpose of tilting the mixing chamber 9, one of the end plates 10 carries an internal gear segment 63 meshing with a pinion 64 mounted on a shaft 65 supported in bearings of the housing 6. To shaft 65 is keyed a worm wheel 66 driven by a worm 67 on a shaft 68 which is also supported in bearings of the housing 6. To shaft 68 is fastened a gear 69 meshing with a pinion 70 mounted on the shaft 71 of an electric motor 72 of the induction type commonly known as a "torque" motor, secured to a side wall of the housing 6. Worm wheel 66 is provided with an oil pan 73 suspended from one of the bearings of shaft 65. The oil level in pan 73 is maintained by means of a scraper tube 74 which, in operation, collects oil from the face of worm wheel 25 and conducts it to the oil pan. During the tilting of the mixing chamber, when either of its extreme positions is reached, stop lugs 75 provided on each end plate 10 engage with spring-pressed plungers 76, which are slidably supported in lugs 77 of the base 5, thereby stalling the motor 72. Accordingly, this construction eliminates the limit switches and heretofore required motor brakes. In order to facilitate tilting of the mixing chamber 9 by hand, the motor shaft 71 is provided with an extension 78 (Fig. 2) to which a crank handle 79 can be easily attached.

The mixing chamber 9, when in upright position, is closed by a canopy cover 80 made of non-corrosive or other suitable material and fastened to supporting brackets 81 mounted on frames 6 and 7, respectively. This canopy cover 80 is also provided with a labyrinth seal 82 of well known construction (Fig. 1) which prevents any leakage between the bowl ends and the cover. The latter is furthermore equipped with an aperture 83 provided with a slidable shutter 84. When the mixing bowl is in an upright position the shutter 84 may be opened to permit the introduction of the ingredients of the dough through the aperture 83 of the canopy cover.

In order to obtain true readings of the temperature of the dough during the kneading operation, a thermometer 85 is placed in the canopy cover 80 instead of mounting it on the lower portion of the bowl 9 which is cooled by the water jacket. In order to prevent accidents and to assure that the beater arms 21 and 22 are at rest while the mixing bowl 9 is being tilted, the machine is equipped with a safety lever 86 which is disposed in the path of the gear segment 63 and during the tilting operation, engages with a cam surface 87 (Fig. 1) on the exterior of the gear segment 63. Lever 86 is fastened on a shaft 88 supported in lugs 89 of base 5. Shaft 88 carries a spring-tensioned lever 90 engaging with a limit switch 91 controlling the entire beater arm drive, as will be presently described. All electric wires and cables W of this machine are placed in grooves 92 of the base casing 5, which together with the cover plates 8 form the conduit of the wires.

In the operation of the machine, the mixing chamber is in upright position and the beaters 21 and 22 are first driven at a differential speed, that is different speeds, throughout the initial stages of its operation during which the ingredients of the dough or batter are being incorporated, and at substantially the same speed, in unison, during the final stages of its operation while the dough is being kneaded. It has been recognized that a differential speed of the beaters produces a more uniform dough and incorporates the ingredients more rapidly, while on the other hand, the movement of the beaters in unison affords quicker and more thorough kneading of the dough. Accordingly, since the greater part of the time required for working the dough is necessary for kneading, and the rotation of the beaters in unison will knead the dough to the desired condition in shorter time, less total time will be required with a machine having the novel mode of operation. The present invention, therefore, includes a novel process for working the dough, as well as a novel machine for carrying out the process.

Figure 4:
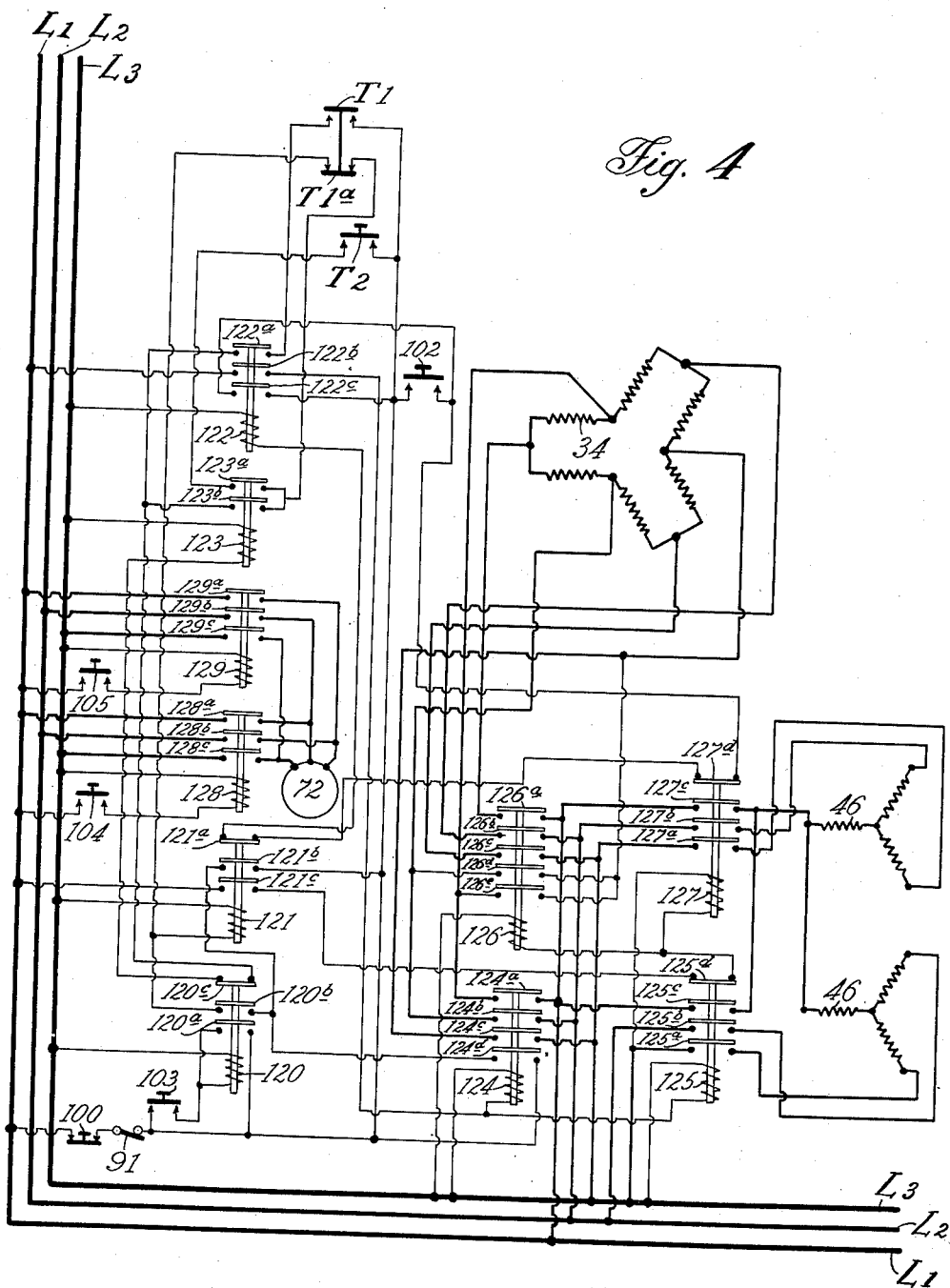
Fig. 4 is a schematic wiring diagram of the electric control for the beater and tilt motors.

To these ends the operation of the beaters may be electrically or mechanically controlled as shown in Figs. 4 and 5, respectively. In Fig. 4 there is illustrated a wiring diagram of an electric control for the beater motors 34 and 46 and the tilt motor 72, which are depicted therein as of the 3-phase alternating current induction type, although it should be understood that alternating current motors of different phase and/or type or direct current motors of suitable type may be used. This controller permits the varying of the relative speeds of the beater motors to cause the beaters to be driven at a differential speed or in unison, and the same may be effected manually or semi-automatically as will be presently described.

The beater motor 34 may be of the single winding, two-speed, consequent pole design and the beater motor 46 is preferably of the two-winding, two-speed design. The beater motors 34 and 46 and the tilt motor 72 are connected to the lines L1, L2 and L3 which conduct current of the required phase and frequency, the line L' being connected through a push-button 100 and the limit switch 91 to a timer circuit and a manual control circuit of any suitable or known type which are connected to the line L3.

For the manual operation of the machine the push-button 102 in the manual control circuit is depressed thereby energizing relay 122 (Fig. 4) which through contacts 122a and 122b energizes relays 124 and 125 which through their respective contacts 124a, 124b, 124c, 125a, 125b and 125c start the beater motors 34 and 46 which continue operating at a differential speed. The depression of push button 102 also causes contacts 122c and 124d to be closed and 125d to open, whereupon both beater motors start and continue operating at a differential speed. Upon depressing the push-button 103 both beater motors accelerate until they are operating at the same speed and thus drive the beaters in unison. This is accomplished by the depression, as before stated, of push button 103 which energizes relay 120 which by means of contacts 120a, 120b and 120c energize relay 121. The energization of this latter relay causes the breaking of the low speed circuit, thus cutting out the low speed coils of the motors and starting them to operate at high speed in unison. This is accomplished through contacts 121c and 125d which are now closed, whereby relays 126 and 127 are energized and through their contacts 126a to 126e and 127a to 127c throw the motors into operation at high speed. When the push-button 100 is pressed both beater motors stop whether operating at a differential or the same speed.

For the semi-automatic operation of the machine the timer switches T1 and T2, in the timer circuit which are of well known construction such as model #630 manufactured by Walser Automatic Timing Co., New York, N. Y., are set and started; and the push-button 102 is depressed, whereupon the beater motors start and operate at a differential speed until the timer T1 breaks the circuit through it at the end of the predetermined interval for which it was set, the beater motors then operating at a higher speed to drive the beaters in unison until the timer T2 breaks the circuit through it at the end of the period for which it was set.

As a further amplification of the semi-automatic operation of the machine the depression of push button 102 energizes the maintaining line by means of relay 122 which through contacts 122a, 122b, and 122c causes energization of relays 123, 124 and 125 which through their contacts 124a, 124b, 124c and 125a, 125b and 125c start and continue the motors 34 and 46 operating at a differential speed. The transition from differential to high speed is accomplished automatically. After the time for which timer switch T1 was set, has elapsed, it opens and timer switch T1a closes automatically. This construction is well known in the type of timer used as hereinbefore stated. The closing of switch T1a causes the energization of relay 121 which through its contact 121a cuts out the differential speed line and through contacts 121b and 121c which close and contact energizes coils 127 and 128 and set motors 34 and 46 into operation at uniform or high speed.

To tilt the mixing bowl downwardly to a position wherein its contents are discharged, the circuit through the tilt motor 72 is closed only when the push-button 104 is depressed manually, the limit switch 91 being actuated by the bowl at an intermediate position thereof to break the circuit through the beater motors in a manner well known in the art. Depression of push button 104 causes energization of relay 128 which through its contacts 128a, 128b and 128c set in operation tilt motor 72 to tilt the bowl downward to discharging position. When the mixing bowl reaches the limit of its downward swing the tilt motor is stalled in the manner described above. Upon depressing the push-button 105 manually relay 129 is energized and through its contacts 129a 129b and 129c operates motor 72 in the reverse direction and the mixing bowl tilts upwardly while the button 105 is held down, until it reaches an upright position and the tilt motor is again stalled in the manner hereinbefore described.

In Fig. 5 of the drawings an alternative arrangement for manually controlling the operation of the beaters mechanically is shown. With this embodiment of the invention the beater frames may be driven at differential speed or in unison from an electric motor of any known type. For this purpose the ends of the shaft of the motor M are coupled to variable-speed drives 110 and 111 of the Reeves or other suitable type driving pinions 112 and 113 respectively. The pinion 112 meshes with a gear-wheel 114 carried by one of the beater shafts, and the pinion 113 meshes with a gear-wheel 115 carried by the other beater shaft. By adjusting either or both of the variable speed drives the desired differential speed of, or unison of rotation of the beater arms may be obtained. With the Reeves drives chosen to illustrate the invention this result may be obtained by turning the hand-wheels 116 and 117 thereof.

It will be understood that the beaters may be rotated in the same or opposite directions and the relative speeds of the beaters may be varied during their differential operation, and that their final speeds may be varied with respect to their initial speeds while they are driven differentially or in unison. Moreover, it should be understood that the speeds of the beaters need not necessarily be the same while they are driven in unison, as with the electrical control shown for the beaters their speeds will only be substantially the same. Nor is the described sequence of differential speeds and unison essential to the invention, since various other sequences and alternations of differential speed and unison may be employed.

While the mixing bowl may be of any desired or suitable configuration, the shape used in the present embodiment of the invention has a novel relation with respect to the paths of the beaters, the curvature of the bottom of the bowl in this case being eccentric to the paths of the beaters. The illustrated curvature of the bowl promotes a more thorough incorporation of the ingredients of the batch and assures a more efficient ejection of the finished batch when the beaters are rotated while the bowl is in a tilted position.

This relation of the beaters and the bowl provides a greater clearance between the sides of the bowl and the outer beater than that between the bottom of the bowl and the outer beater, and the same effect may be obtained with bowls having non-circular bottoms if the same clearances are provided and no part of the bowl is concentric with the path of the beaters, thus producing a desirable wedging effect at all points between the bowl and beaters.

What is claimed is:

1. In a mixer, the combination with a mixing bowl, of a set of beaters arranged within said bowl, and means for rotating said beaters at a differential speed or in unison, said means including shafts on which said beaters are mounted, electric motors connected to said shafts to drive the same together with the beaters thereon, and a timer circuit connected to said motors to drive them together with the beaters at a differential speed for a predetermined interval of time and at the same speed for a further interval of time.

2. In a mixer, the combination with a mixing bowl having hollow trunnions, a shaft projecting through one of said trunnions into said bowl, a sleeve splined on the portion of said shaft projecting into the bowl, inner and outer beaters having hubs mounted on said sleeve, a member fastened to the inner end of said shaft and bearing against the inner end of said sleeve, a washer of packing material bearing against the other end of said sleeve, and a gland holding said washer thereagainst, whereby said washer may be readily removed and replaced upon removing said member and sleeve.

3. In a mixer, the combination with a mixing bowl provided with trunnions, of stationary bearings in which said trunnions are supported, an electric motor geared to said bowl to tilt it on its trunnions, and means positioned for engagement with devices connected to said bowl for stalling said motor at predetermined limits of the tilting movement of the bowl.

4. In a mixer, the combination with a mixing bowl provided with trunnions, of stationary bearings in which said trunnions are supported, an electric motor geared to said bowl to tilt it on its trunnions, and means positioned for contact with devices connected to said bowl for stalling said motor at predetermined limits of the tilting movement of the bowl, said motor being of the induction "torque" type.

5. In a mixer, the combination with a mixing bowl provided with trunnions, of stationary bearings in which said trunnions are supported, an electric motor geared to said bowl to tilt it on its trunnions, and means for stalling said motor at predetermined limits of the tilting movement of the bowl, said means including lugs provided on said bowl, and members engaging said lugs at the predetermined limits of the tilting movement of the bowl to stop the movement of the bowl and thus stall said motor.

6. In a mixer, the combination with a mixing bowl provided with trunnions, of stationary bearings in which said trunnions are supported, and an electric motor geared to said bowl to tilt it on its trunnions, said motor having a shaft extension and being provided with a crank handle mounted on said shaft extension, whereby the mixing bowl may be tilted manually upon turning said crank handle.

7. In a mixer, the combination with a mixing bowl adapted to receive a batch of ingredients which are to be incorporated and kneaded, said bowl being provided with hollow trunnions, shafts projecting through said trunnions into said bowl, beaters fixed on the portions of said shafts projecting into said bowl, beater motors geared to said shafts, an electric control for said beater motors to drive said beaters at a differential speed to incorporate the ingredients of the batch, and in unison to knead the batch, a tilt motor geared to said bowl to tilt the same on its trunnions, and a limit switch in said electric control arranged to be opened by said bowl during the tilting thereof to incapacitate said beater motors.

8. In a mixer, the combination with a mixing bowl having hollow trunnions, of a shaft projecting through one of said trunnions into said bowl, a sleeve connected to the portion of said shaft projecting into said bowl, inner and outer beaters having hubs mounted on said sleeve, and a washer of packing material adjacent the outer end of said sleeve, whereby said washer may be readily removed and replaced upon removing said sleeve.

9. In a mixer, the combination with a mixing bowl, of a set of beaters arranged within said bowl, and means for rotating said beaters at a differential speed or in unison, said means including shafts on which said beaters are mounted, driving means for said shafts, and timing means for controlling said driving means to cause them to drive the beaters at a differential speed for a predetermined interval of time and then substantially in unison for a further interval of time.

LESTER FERENCI.